D. MOREHOUSE.
LUBRICATING DEVICE FOR ENGINES.
APPLICATION FILED APR. 29, 1911.
1,013,678.
Patented Jan. 2, 1912.
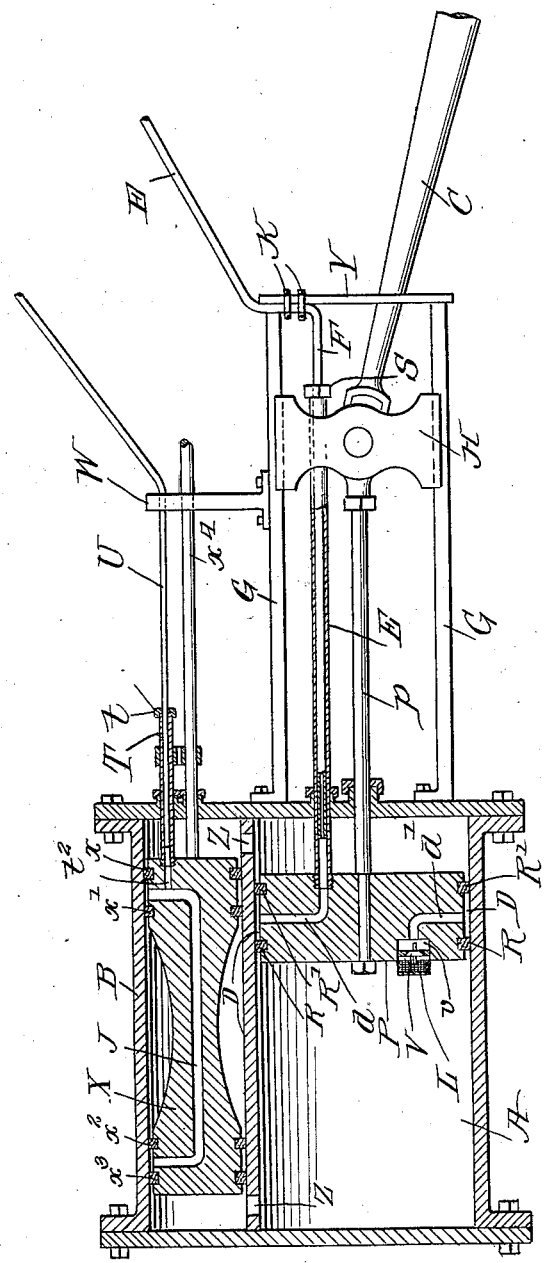
WITNESSES
Samuel E. Wade
L. A. Stanley
INVENTOR
DAVID MOREHOUSE
BY Munn & Co.
ATTORNEYS

UNITED STATES PATENT OFFICE.

DAVID MOREHOUSE, OF DELPHOS, OHIO.

LUBRICATING DEVICE FOR ENGINES.

1,013,678.          Specification of Letters Patent.          Patented Jan. 2, 1912.

Application filed April 29, 1911. Serial No. 623,999.

*To all whom it may concern:*

Be it known that I, DAVID MOREHOUSE, a citizen of the United States, and a resident of Delphos, county of Allen, and State of Ohio, have invented certain new and useful Improvements in Lubricating Devices for Engines, of which the following is a specification.

My invention relates to improvements in lubricating devices for engines, and it consists in the combinations, constructions and arrangements herein described and claimed.

An object of my invention is to provide a device by means of which the pistons and cylinders of engines may be lubricated without subjecting the oil to back pressure generated within the cylinder itself.

A further object of my invention is to provide a means of lubricating the cylinders of steam engines which employ superheated steam without subjecting the lubricating fluid to the intense heat of the steam itself.

A further object of my invention is to provide a device by means of which the piston of an internal combustion engine may be lubricated directly without coming into contact with the explosive gases which may have a deleterious effect on the lubricating fluid.

Other objects and advantages will appear in the following specification, and the novel features of the device will be particularly pointed out in the appended claims.

My invention is illustrated in the accompanying drawing forming part of this application, the same being a sectional view through the cylinder and valve chest of an engine, certain portions of the device being shown in elevation.

Referring now to the drawing, I have shown therein a cylinder A of the usual type which is provided with a valve casing B. In this case the valve casing is shown as being integral with the cylinder, but it may be separate therefrom and secured thereto without departing from the spirit of the invention. Within the cylinder A is a piston P whose piston rod $p$ extends through the end of the cylinder and is connected with a cross head H which is supported in the guides G that are secured to the end of the cylinder. The cross head H is pivotally connected by means of the pitman C to the crank (not shown).

The piston P is provided with the resilient packing rings R and $R^1$. Between the rings R and $R^1$ is an annular channel D, which forms an oil chamber in which the oil comes into direct contact with the walls of the cylinder during the travel of the piston. On one side of the piston the annular channel D communicates by means of a passage $d$ with a pipe E which is screwed into the piston and which passes through the end of the cylinder and is secured to the cross head H. A smaller pipe F is disposed within the pipe E, passes through a stuffing box S at the end of the pipe E and is secured to the yoke Y which connects the ends of the guides G by means of the clamps K. The end of the pipe E communicates with the oil receptacle (not shown). On the opposite side of the piston the channel D communicates by means of a passage $d^1$ with a small valve casing $v$, which is in reality a recess in the piston P. Disposed in the recess $v$ is a valve, V and on one side thereof is a perforated receptacle L.

In the valve casing B is the main piston valve X which is provided with the packing rings $x$, $x^1$, $x^2$ and $x^3$. The space between the rings $x^1$ and $x$ constitutes an annular channel while a similar annular channel is formed by the space between the packing rings $x^2$ and $x^3$. The two annular channels are connected by means of a passage way J. The valve stem $x^4$ extends through the end of the casing and may be operated in any suitable manner. A pipe $t$ is secured to the valve, passes through the casing and terminates in a stuffing box $t$. One end of a smaller pipe U is disposed within the tube T. This tube is secured to a standard W and the end leads to the oil supply (not shown). A small passage $t^2$ establishes communication with the end of the pipe T and the passage J.

From the foregoing description of the various parts of the device, the operation thereof may be readily understood. The pipes E and F are telescopic, and as the piston P is reciprocated the smaller pipe works in and out of the larger pipe. The same thing is true of the pipes T and U. The space D is, therefore, in direct communication with the oil supply at all times, and the oil is delivered to the cylinder without being subjected to the pressure of the steam or gases. The provision of the valve V permits an excess of pressure from the annular channel D to force the oil past the valve and through the perforated receptacle L into the interior of the cylinder, but when the pressure rises within the cylinder, this valve will close automatically.

In the case of the piston valve X the oil is distributed between the packing rings at both ends through the medium of the passage J. As the valve moves so as to bring the channels between the packing rings into registration with the ports Z the oil will pass through these ports into the cylinder.

It will thus be seen that I have provided a device in which the oil may be distributed evenly to the parts where it is most needed. It is protected from the back pressure due to the expanding steam or the pressure of the gases (if the device is used with an internal combustion engine). Moreover the lubricating fluid is not subject to the high heat which it would meet with if forced directly into the cylinder.

I claim:

1. The combination with a cylinder and piston of an engine, of a pair of packing rings for the piston, a source of oil supply, means for establishing communication permanently between said source of oil supply and the space between the packing rings, means for establishing communication between the space between the packing rings and the interior of the cylinder on one side of the piston, and means for preventing back pressure on the oil.

2. The combination with a cylinder and piston of an engine, of a pair of packing rings for the piston, a source of oil supply, means for establishing communication permanently between said source of oil supply and the space between the packing rings, said means comprising a pipe secured to said piston and communicating with the space between said packing rings, and a stationary pipe having one end extending into said first named pipe and communicating with said oil supply, means for establishing communication between the space between the packing rings and the interior of the cylinder on one side of the piston, and means for permitting a flow of oil under pressure into the interior of the cylinder and for preventing the forcing of the oil back into the oil supply.

3. The combination with a cylinder, piston and piston rod of an engine, of a pair of packing rings carried by said piston, a cross-head secured to said piston rod, a pipe secured to said cross-head at one end and to said piston at the other, said pipe passing through the end of the cylinder and communicating with a space between the packing rings, a stationary pipe having one end arranged to extend within said first mentioned pipe, the other end being in communication with the oil supply, a conduit for establishing communication between the space between the packing rings and the interior of the cylinder on one side of the piston, and a valve arranged to open to permit the entrance of oil into the cylinder and to close to prevent back pressure upon the oil.

4. The combination with a valve casing and slide valve of an engine, of a pair of packing rings carried by said valve at each end thereof, a passage establishing communication between the spaces between the packing rings, a pipe secured to the valve stem and arranged to pass through the valve casing and having communication with the passageway, and a stationary pipe having one end disposed within said first mentioned pipe and the other end communicating with the oil supply.

DAVID MOREHOUSE.

Witnesses:
H. L. LOGAN,
GEO. W. WHITE.

Copies of this patent may be obtained for five cents each, by addressing the "Commissioner of Patents, Washington, D. C."